US008674024B2

(12) United States Patent
Buryak et al.

(10) Patent No.: US 8,674,024 B2
(45) Date of Patent: *Mar. 18, 2014

(54) MOULDING COMPOSITION (75) Inventors: Andrey Buryak, Linz (AT); Albrecht Dix, Linz (AT); Magnus Palmlof, Vastra Frolunda (SE); Anneli Pakkanen, Vasterskog (FI); Christian Piel, Linz (AT); Ayodele Olutayo Fiola, Linz (AT); Tore Dreng, Larvik (NO); Janne Maaranen, Tuusula (FI); Alexander Krajete, Linz (AT); Susana Filipe, Leonding (AT)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/575,334

(22) PCT Filed: Jan. 27, 2011

(86) PCT No.: PCT/EP2011/051173
§ 371 (c)(1),
(2), (4) Date: Oct. 4, 2012

(87) PCT Pub. No.: WO2011/092264
PCT Pub. Date: Aug. 4, 2011

(65) Prior Publication Data
US 2013/0030125 A1 Jan. 31, 2013

(30) Foreign Application Priority Data
Jan. 29, 2010 (EP) .................................... 10250150

(51) Int. Cl.
*C08F 8/00* (2006.01)
*C08L 23/04* (2006.01)
(52) U.S. Cl.
USPC .......................................... 525/191; 525/240
(58) Field of Classification Search
USPC ................................................. 525/191, 240
See application file for complete search history.

(56) References Cited

U.S. PATENT DOCUMENTS

| | | | |
|---|---|---|---|
| 3,887,534 A | 6/1975 | Baba et al. | |
| 4,234,624 A | 11/1980 | Linderoth et al. | |
| 4,493,923 A | 1/1985 | McCullough, Jr. et al. | |
| 4,508,872 A | 4/1985 | McCullough, Jr. et al. | |
| 4,525,322 A * | 6/1985 | Page et al. | 264/531 |
| 4,599,391 A | 7/1986 | Yamamoto et al. | |
| 4,639,386 A | 1/1987 | Akao | |
| 4,677,007 A | 6/1987 | Murray et al. | |
| 4,696,979 A | 9/1987 | Shiga et al. | |
| 4,871,819 A | 10/1989 | Oonishi et al. | |
| 4,994,539 A | 2/1991 | Orikasa et al. | |
| 5,286,540 A | 2/1994 | Suga et al. | |
| 5,317,035 A | 5/1994 | Jacoby et al. | |
| 5,457,016 A | 10/1995 | Dethlefs | |
| 5,486,558 A | 1/1996 | Lee | |
| 5,752,362 A | 5/1998 | Eichbauer et al. | |
| 5,773,123 A | 6/1998 | Anwyll, Jr. | |
| 6,265,055 B1 | 7/2001 | Simpson et al. | |
| 6,291,590 B1 | 9/2001 | Sainio et al. | |
| 6,440,509 B1 | 8/2002 | Littlejohn et al. | |
| 6,503,637 B1 | 1/2003 | Van Loon | |
| 6,559,232 B2 | 5/2003 | Inoue et al. | |
| 6,573,334 B1 | 6/2003 | Pitteri et al. | |
| 6,583,241 B1 | 6/2003 | Beach et al. | |
| 6,733,717 B1 | 5/2004 | Marczinke et al. | |
| 6,770,714 B2 | 8/2004 | Ommundsen et al. | |
| 2002/0132950 A1 | 9/2002 | Smith et al. | |
| 2005/0161866 A1 | 7/2005 | Batlaw et al. | |
| 2005/0200046 A1 | 9/2005 | Breese | |
| 2005/0234217 A1 | 10/2005 | Bigiavi et al. | |
| 2006/0142495 A1 | 6/2006 | Lalho et al. | |

(Continued)

FOREIGN PATENT DOCUMENTS

| | | |
|---|---|---|
| EP | 0111602 | 6/1984 |
| EP | 0146270 | 6/1985 |

(Continued)

OTHER PUBLICATIONS

Adebi J App Polym Sci vol. 101, 1456-1462, 2006.
International Search Report dated Apr. 2, 2010 for international application No. PCT/EP2009/063251.
International Search Report dated Jan. 29, 2009 for international application No. PCT/US2008/010359.
International Search Report dated Nov. 12, 2009 for international application No. PCT/EP2009/004929.

(Continued)

*Primary Examiner* — Nathan M Nutter
(74) *Attorney, Agent, or Firm* — Gardner, Groff, Greenwald, & Villanueva, P.C.

(57) ABSTRACT

A polyethylene moulding composition having a multimodal molecular weight distribution, having a density according to ISO 1183 at 23° C. in the range of 920 to 960 kg/m³ and an MFR190/2 according to ISO 1133 in the range of 0.05 to 10 g/10 min, said polyethylene moulding composition comprising at least three ethylene polymer fractions having distinct molecular weights: A) 15 to 50 wt % of a low molecular weight ethylene homopolymer or copolymer fraction with a weight average molecular weight Mw in the range of 15 to 40 kg/mol; B) 15 to 50 wt % of a medium molecular weight ethylene homopolymer or copolymer fraction with a weight average molecular weight Mw in the range of 70 to 200 kg/mol; and C) 15 to 50 wt % of a high molecular weight ethylene homopolymer or copolymer fraction with a weight average molecular weight Mw in the range of 220 to 400 kg/mol, provided that one of A, B and C is an ethylene homopolymer and at least one other component is an ethylene copolymer with at least one $C_3$-$C_{10}$ comonomer; and wherein the composition has—a Shore D hardness measured according to ASTM D2240-05 (15 sec) of at least 56.0.

21 Claims, 3 Drawing Sheets

(56) References Cited

U.S. PATENT DOCUMENTS

| | | |
|---|---|---|
| 2007/0191531 A1 | 8/2007 | Gaschlet et al. |
| 2008/0276717 A1 | 11/2008 | Teh et al. |
| 2010/0003435 A1 | 1/2010 | Jaaskelainen et al. |
| 2010/0009156 A1 | 1/2010 | Daviknes et al. |
| 2010/0304062 A1 | 12/2010 | Daviknes et al. |
| 2011/0028665 A1 | 2/2011 | Eriksson et al. |
| 2011/0132864 A1 | 6/2011 | Jamtvedt et al. |
| 2011/0162869 A1 | 7/2011 | Smedberg |
| 2011/0168427 A1 | 7/2011 | Smedberg et al. |
| 2011/0180304 A1 | 7/2011 | Smedberg et al. |
| 2011/0290529 A1 | 12/2011 | Pakkenen et al. |
| 2013/0018154 A1* | 1/2013 | Buryak et al. ................ 525/240 |

FOREIGN PATENT DOCUMENTS

| | | |
|---|---|---|
| EP | 0151883 | 8/1985 |
| EP | 0184362 | 6/1986 |
| EP | 0251340 | 1/1988 |
| EP | 0260791 | 3/1988 |
| EP | 0309138 | 3/1989 |
| EP | 0463402 | 1/1992 |
| EP | 0517868 | 7/1992 |
| EP | 0585585 | 9/1992 |
| EP | 0688794 | 12/1995 |
| EP | 0735090 | 10/1996 |
| EP | 0903356 | 3/1999 |
| EP | 0928797 | 7/1999 |
| EP | 0949274 | 10/1999 |
| EP | 1170329 | 9/2002 |
| EP | 1333044 | 8/2003 |
| EP | 1375528 | 1/2004 |
| EP | 1488924 | 12/2004 |
| EP | 1655334 | 5/2006 |
| EP | 1674238 | 6/2006 |
| EP | 1712574 | 10/2006 |
| JP | 10036581 | 10/1998 |
| JP | 2003138074 | 5/2003 |
| WO | 9308222 | 4/1993 |
| WO | 9413707 | 6/1994 |
| WO | 9523829 | 9/1995 |
| WO | 9706951 | 2/1997 |
| WO | 9750093 | 12/1997 |
| WO | 9924478 | 5/1999 |
| WO | 9924479 | 5/1999 |
| WO | 9964509 | 12/1999 |
| WO | 9965039 | 12/1999 |
| WO | 0032695 | 6/2000 |
| WO | 0071615 | 11/2000 |
| WO | 0202323 | 1/2002 |
| WO | 0231046 | 4/2002 |
| WO | 0236672 | 5/2002 |
| WO | 02038383 | 8/2002 |
| WO | 02086916 | 10/2002 |
| WO | 03000740 | 1/2003 |
| WO | 03064519 | 8/2003 |
| WO | 04000902 | 12/2003 |
| WO | 2004067654 | 8/2004 |
| WO | 2005009714 | 2/2005 |
| WO | 2005074428 | 8/2005 |
| WO | 2005103132 | 8/2005 |
| WO | 2006037603 | 4/2006 |
| WO | 2006053740 | 5/2006 |
| WO | 2006065799 | 6/2006 |
| WO | 2006131266 | 12/2006 |
| WO | 2007022908 | 3/2007 |
| WO | 2007042217 | 4/2007 |
| WO | 2007071445 | 6/2007 |
| WO | 2007071447 | 6/2007 |
| WO | 2008009393 | 1/2008 |
| WO | 2008074493 | 6/2008 |
| WO | 2010003649 | 1/2010 |
| WO | 2010003651 | 1/2010 |
| WO | 2010047743 | 4/2010 |
| WO | 2011038886 | 4/2011 |
| WO | 2011092263 | 8/2011 |

OTHER PUBLICATIONS

International Search Report dated Nov. 12, 2009 for international application No. PCT/EP2009/004931.

International Search Report dated Oct. 15, 2009 for international application No. PCT/US2009/004930.

MDO Film Oreintated PE and PP Packaging film (2004 Borealis A/S; IN0128/GB FF 2004 10).

Myhre er al., Oreintated PE films; Expanding Oppurtunities with Brostar PE; Maack Specialty, 2001.

Office Action dated Feb. 23, 2011 for Chinese application No. 200780040208.4.

Office Action dated May 30, 2011 for Chinese application No. 200880102737.7.

Written Opinion dated Mar. 11, 2008 for international application No. PCT/EP2007/009918.

International Search Report dated Mar. 17, 2011 for international application No. PCT/EP2011/051172.

Written Opinion dated Mar. 17, 2011 for international application No. PCT/EP2011/051172.

International Search Report dated Mar. 17, 2011 for international application No. PCT/EP2011/051173.

Written Opinion dated Mar. 17, 2011 for international application No. PCT/EP2011/051173.

* cited by examiner

Figure 1. Tensile modulus vs. density.

Figure 2. Stress at yield vs. density.

Figure 3. Shore D hardness (ASTM D2240-05) at 15 seconds vs. density for the inventive examples and ME6053

Figure 4. Shore D hardness (ASTM D2240-05) at 3 seconds vs. density for the inventive examples and ME6053.

Figure 5. Charpy notched impact strength at -20 °C vs. charpy notched impact strength at 0 °C.

Figure 6. FNCT at 9.0 MPa and 50°C vs. density.

MOULDING COMPOSITION

IN THE CROSS-REFERENCE TO RELATED APPLICATIONS

This application is a U.S. national phase application under 35 USC 371 of international application number PCT/EP2011/051173, filed Jan. 27, 2011, which claims priority to European Application No. 10250150.9, filed Jan. 29, 2010, which is hereby incorporated herein by reference in its entirety for all purposes.

The present invention relates to a polyethylene composition having excellent mechanical properties, hardness and abrasion resistance and also having improved impact resistance and slow crack growth. Furthermore, the present invention relates to a process for the production of such a composition as well as to the use of such a composition for the production of pipes, for moulding applications, and wire and cable applications.

Excellent slow crack growth performance of a polymer resin is important in many applications, including pipes and blow moulded articles. Good impact strength is also required for the finished article to withstand an impact without breaking. In addition, excellent mechanical properties combined with good abrasion resistance and high hardness are essential properties for wire and cable applications.

The polyethylene composition of the present invention has a trimodal molecular weight distribution, i.e. it is a composition comprising three ethylene polymer fractions having distinct molecular weights.

Injection moulding may be used to make a wide variety of articles including articles having relatively complex shapes and a range of sizes. Injection moulding is, for instance, suited for the manufacture of caps and closures, and articles used in transportation packaging which often have a particular form suited to the objects which they carry.

Examples of such articles include boxes, bins, pallets, pails, trays and crates. Furthermore, injection moulding is widely used to produce articles for houseware applications, such as sink bowls and drainers, mixing bowls, food containers and buckets, as well as to produce thin wall packaging articles such as open top plastic containers for frozen or fresh food or non-food applications like paint, adhesives, cosmetics and pharmaceuticals.

As raw materials become more expensive and consumers and manufacturers more demanding, polymer retailers are looking to provide lower costs, high performance articles to their customers.

Important properties of the polymer to be injection moulded are its mechanical properties which, in turn, determine the properties of the final moulded article. In particular, the polymer must have good impact resistance, and, simultaneously, a good balance between environmental stress crack resistance ESCR (which e.g. is measured in terms of the bell test or FNCT) and stiffness (which e.g. is measured in terms of the E-modulus). Of course, the polyethylene composition at the same time must have good processability, such as good flowability.

To down gauge and produce lighter articles there is an increasing need for stiffer polymeric materials.

Higher stiffness allows articles to be manufactured with thinner walls and hence allows less raw materials to be used per article than for less stiff articles. Thinner walls mean lighter articles and hence lower transport costs. Lighter articles also mean a reduction in cycle time which is also of great importance. Lighter articles will cool more rapidly allowing the moulding process to be run more frequently and more articles can be produced in a given period of time.

Unfortunately it is known in the state of the art that other important properties, such as impact resistance and ESCR, decrease as stiffness of the polymer increases, since these properties are contradictory at least in part because, for example, ESCR improves with decreasing density whereas stiffness improves with increasing density.

In general, stiffness and ESCR can be improved by the art skilled person in known ways, e.g. by increasing the molecular weight of the polymer. Higher molecular weight polymers are known to possess improved mechanical properties over polymers of lower molecular weight. However, increasing the molecular weight of the polyethylene usually decreases the processability and particularly flowability of the same. Polymers with poor flow are not readily extruded or moulded and are thus of limited value.

There is also a relation between stiffness and impact strength. Stiffer materials tend to have poorer impact strength as they show more brittle behaviour. High impact strength materials tend to be soft to be able to absorb impacts. For moulded articles the ability to withstand impact is an important property. However, the manufacture of articles with high stiffness and good impact properties is a problem known in the state of the art.

Thus, to create superior articles from polyethylene moulding compositions, it is important that the used composition has good or even excellent impact resistance and simultaneously a good or even excellent balance of mechanical properties, in particular in ESCR and stiffness as measured in terms of the E-modulus. At the same time the polyethylene moulding compositions should exhibit good processability, such as good flowability.

Although much development work has been done in the field of polyethylene moulding compositions, there remains a need for a polyethylene composition suitable for use in injection, blow and compression moulding, in particular for wire and cable applications, caps and closure, transport packaging and houseware applications, which provides a combination of, on the one hand, excellent mechanical properties including excellent impact strength, stress crack resistance and stiffness as well as a good balance between these mechanical properties, and improved hardness and abrasion resistance.

Surprisingly, these goals can be achieved by a polyethylene moulding composition comprising at least one homopolymer fraction and at least one copolymer fraction in an at least three component system wherein the three fractions comprise one low molecular weight fraction, one medium molecular weight fraction and one high molecular weight fraction.

SUMMARY OF INVENTION

The present invention thus provides a polyethylene moulding composition having a multimodal molecular weight distribution, having a density according to ISO 1183 at 23° C. in the range of 920 to 960 kg/m$^3$ and an MFR$_{190/2}$ according to ISO 1133 in the range of 0.05 to 10 g/10 min, said polyethylene moulding composition comprising at least three ethylene polymer fractions having distinct molecular weights:

A) 15 to 50 wt % of a low molecular weight ethylene homopolymer or copolymer fraction with a weight average molecular weight M$_w$ in the range of 15 to 40 kg/mol;

B) 15 to 50 wt % of a medium molecular weight ethylene homopolymer or copolymer fraction with a weight average molecular weight M$_w$ in the range of 70 to 200 kg/mol; and C) 15 to 50 wt % of a high molecular weight ethylene homopolymer or copolymer fraction with a weight average molecular weight $M_w$ in the range of 220 to 400 kg/mol, provided that one of A, B and C is an ethylene homopolymer and at least one other component is an ethylene copolymer with at least one $C_3$-$C_{10}$ comonomer;

and wherein the composition has a Shore D hardness measured according to ASTM D2240-05 (15 sec) of at least 56.0.

Viewed from another aspect the invention provides a moulded article comprising a composition as hereinbefore defined.

Viewed from another aspect the invention provides use of the composition as hereinbefore defined in the manufacture of a molded article, in particular a compression moulded or injection moulded article.

It should be noted that the at least trimodal polymer composition of the present invention is characterized, not by any single one of the above defined features, but by the combination of all the features defined above. By this unique combination of features it is possible to obtain a polyethylene moulding composition of superior performance, particularly with regard to hardness but also in terms of stiffness/ESCR balance and impact properties.

Viewed from another aspect the invention provides a process for the preparation of a composition as hereinbefore defined comprising blending A) 15 to 50 wt % of a low molecular weight ethylene homopolymer or copolymer fraction with a weight average molecular weight $M_w$ in the range of 15 to 40 kg/mol;

B) 15 to 50 wt % of a medium molecular weight ethylene homopolymer or copolymer fraction with a weight average molecular weight $M_w$ in the range of 70 to 200 kg/mol; and C) 15 to 50 wt % of a high molecular weight ethylene homopolymer or copolymer fraction with a weight average molecular weight $M_w$ in the range of 220 to 400 kg/mol, provided that one of A, B and C is an ethylene homopolymer and at least one other component is an ethylene copolymer with at least one $C_3$-$C_{10}$ comonomer;

and wherein the composition has a multimodal molecular weight distribution, a density according to ISO 1183 at 23° C. in the range of 920 to 960 kg/m³;

an $MFR_{190/2}$ according to ISO 1133 in the range of 0.05 to 10 g/10 min, and a Shore D hardness measured according to ASTM D2240-05 (15 sec) of at least 56.0.

Viewed from another aspect the invention provides a polyethylene moulding composition having a multimodal molecular weight distribution, having a density according to ISO 1183 at 23° C. in the range of 920 to 960 kg/m³ and an $MFR_{190/2}$ according to ISO 1133 in the range of 0.05 to 10 g/10 min, said polyethylene moulding composition comprising at least three ethylene polymer fractions having distinct molecular weights:

A) 15 to 50 wt % of a lower molecular weight ethylene homopolymer or copolymer fraction with an $MFR_{190/2}$ according to ISO 1133 of at least 50 g/10 min;

B) 15 to 50 wt % of a medium molecular weight ethylene homopolymer or copolymer fraction with an $MFR_{190/2}$ of less than 10 g/10 min; and C) 15 to 50 wt % of a higher molecular weight ethylene homopolymer or copolymer fraction with an $MFR_{190/21}$ less than that of fraction B and in the range of 0.05 to 5 g/10 min., provided that one of A, B and C is an ethylene homopolymer and at least one other component is an ethylene copolymer with at least one $C_3$-$C_{10}$ comonomer;

and wherein the composition has a Shore D hardness measured according to ASTM D2240-05 (15 sec) of at least 56.0.

DETAILED DESCRIPTION OF INVENTION

Wherever the term "molecular weight" is used herein, the weight average molecular weight is meant.

Usually, a polyethylene composition comprising at least two polyethylene fractions, which have been produced under different polymerization conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. Thus, in this case the compositions consisting of three fractions are called "trimodal".

The polyethylene moulding composition of the invention is preferably a trimodal polymer and comprises a low molecular weight ethylene homopolymer ($LMW_h$) or copolymer ($LMW_c$) fraction A, a medium molecular weight ethylene homopolymer ($MMW_h$) or copolymer ($MMW_c$) fraction B and a high molecular weight ethylene homopolymer ($HMW_h$) or copolymer ($HMW_c$) fraction C as defined in detail below, where one of A, B and C is a homopolymer with the other two components being copolymers.

The polyethylene moulding composition of the invention has been found to allow the formation of articles having an ideal balance of properties. They have excellent mechanical properties and are readily processed. In particular, articles exhibit an excellent stiffness/ESCR balance and excellent impact strength. In particular, the composition exhibits ideal hardness.

As noted above, the composition has a density according to ISO 1183 at 23° C. in the range of 920 to 960 kg/m³, more preferably 925 to 940 kg/m³.

The $MFR_{190/2}$ according to ISO 1133 of the composition is in the range of 0.05 to 10 g/10 min. Preferably the polyethylene composition has an $MFR_{190/2}$ of 0.1 to 5 g/10 min, more preferably 0.3 to 2 g/10 min.

The tensile modulus (E-modulus) measured on compression moulded samples of the multimodal polyethylene moulding composition is preferably at least 300 MPa, preferably at least 400 MPa, more preferably at least 500 MPa and most preferably at least 550 MPa or more.

The composition of the invention preferably has a Charpy impact strength CIS (0° C.) measured on V-notched samples produced by compression moulding of at least 90 kJ/m², preferably of at least 110 kJ/m². Preferably the composition of the invention has a Charpy impact strength CIS (−20° C.) measured on V-notched samples produced by compression moulding of at least 30 kJ/m², preferably of at least 50 kJ/m², more preferably of at least 80 kJ/m².

In addition, the composition of the invention preferably has an environmental stress crack resistance ESCR measured as FNCT full notch creep test according to ISO/DIS 16770.3 at 50° C. and 9 MPa of at least 20 h, preferably at least 40 h, especially at least 60 h.

Furthermore, the composition of the invention has a Shore D hardness measured according to ASTM D2240-05 (15 sec) of at least 56.0, preferably at least 56.5 and more preferably at least 57.0. The composition of the invention preferably has a Shore D hardness measured according to ASTM D2240-05 (3 sec) of at least 58.0, preferably at least 59.0 and more preferably at least 57.0.

The composition of the invention may have a Taber abrasion resistance according to ASTM D4060-07 (CS-10 wheel) of less than 8 mg/1000 cycles, preferably less than 7 mg/1000 cycles.

In addition, the composition of the invention preferably has a stress at yield of at least 12 MPa, preferably at least 13 MPa.

In addition, the composition of the invention preferably has a stress at break of at least 20 MPa, preferably at least 25 MPa.

In addition, the composition of the invention preferably has a strain at break of at least 450%, preferably at least 500%.

The composition of the invention can, of course, contain any combination of these parameters.

As already stated above, the polyethylene moulding composition of the invention comprises three different ethylene polymer fractions having distinct molecular weights.

Fraction A

Fraction A is a low molecular weight (LMW) ethylene homopolymer or copolymer fraction ($LMW_h$ or $LMW_c$ respectively). The molecular weight of fraction A is in the range of 15 to 40 kg/mol, preferably 20 to 30 kg/mol.

The $MFR_{190/2}$ according to ISO 1133 of fraction A is preferably at least 50 g/10 min, more preferably at least 100 g/10 min. The upper limit for the $MFR_{190/2}$ of the LMW fraction is preferably 1000 g/10 min.

The density according to ISO 1183 at 23° C. of a homopolymer $LMW_h$-fraction is preferably in the range of 960 to 980 kg/m$^3$, preferably 965 to 975 kg/m$^3$. The density according to ISO 1183 at 23° C. of a copolymer $LMW_c$-fraction is preferably in the range of 915 to 935 kg/m$^3$, preferably 920 to 930 kg/m$^3$.

Fraction B

Fraction B is a medium molecular weight (MMW) ethylene homopolymer or copolymer fraction ($MMW_c$ or $MMW_c$ respectively). The MMW-fraction has a molecular weight higher than the LMW-fraction and a lower $MFR_{190/2}$ than the LMW-fraction.

Preferably, the $MFR_{190/2}$ of the MMW fraction is less than 10 g/10 min, preferably of less than 5 g/10 min and more preferably less than 1 g/10 min. The $MMW_h$-fraction furthermore preferably has an $MFR_{190/21}$ in the range of 5 to 50 g/10 min, preferably 10 to 20 g/10 min.

Thus, the MMW-fraction has a molecular weight preferably in the range of 100 to 200 kg/mol, more preferably 110 to 180 kg/mol. The density according to ISO 1183 at 23° C. of a homopolymer $MMW_h$-fraction is preferably in the range of 950 to 965 kg/m$^3$, preferably 952 to 957 kg/m$^3$. The density according to ISO 1183 at 23° C. of a copolymer $MMW_c$-fraction is preferably in the range of 905 to 925 kg/m$^3$, preferably 910 to 920 kg/m$^3$.

Fraction C

Fraction C is a high molecular weight (HMW) ethylene homopolymer or copolymer fraction ($HMW_h$ or $HMW_c$ respectively). The HMW-fraction has a molecular weight higher than the LMW-fraction and the MMW-fraction and a lower $MFR_{190/21}$ than the MMW-fraction.

Thus, the HMW-fraction has a molecular weight in the range of 220 to 400 kg/mol, preferably 250 to 350 kg/mol, more preferably 270 to 295 kg/mol. In one embodiment, the HMW fraction has an MW of less than 300 kg/mol. The density according to ISO 1183 at 23° C. of a homopolymer $HMW_h$-fraction is preferably in the range of 930 to 950 kg/m$^3$, preferably 940 to 950 kg/m$^3$. The density according to ISO 1183 at 23° C. of a copolymer $HMW_c$-fraction is preferably less than 910 kg/m$^3$.

The $HMW_c$-fraction furthermore preferably has an $MFR_{190/21}$ in the range of 0.05 to 5 g/10 min.

It is preferred if two fractions are copolymers and one fraction is a homopolymer.

In a preferred embodiment Fraction A (low molecular weight fraction) is an ethylene homopolymer while Fractions B and C are ethylene copolymers. It is also preferred if fraction B is a homopolymer and fractions A and C copolymers. It is also preferred if fraction C is a homopolymer and fractions A and B copolymers.

The term ethylene homopolymer as used herein is intended to encompass polymers which consist essentially of repeated units deriving from ethylene. Homopolymers may, for example, comprise at least 99.8 wt %, preferably at least 99.9 wt %, of repeat units deriving from ethylene. In a preferred embodiment only ethylene units are detectable in the homopolymer fraction.

The term ethylene copolymer as used herein is intended to encompass polymers comprising repeat units deriving from ethylene and at least one $C_3$-$C_{10}$ copolymer. Preferred copolymers are binary and therefore comprise ethylene and a single comonomer.

The comonomers which can be employed include $C_{3-10}$ alpha olefins, preferably selected from but-1-ene, hex-1-ene, 4-methyl-pent-1-ene, kept-1-ene, oct-1-ene, and dec-1-ene, more preferably but-1-ene and hex-1-ene. Preferably hexene or butene, or a mixture of hexene and butene is used. In one embodiment of the invention only one comonomer is used. The comonomer is e.g. hexene or butene, preferably hexene.

Preferably the ethylene copolymers contain 1 to 15 wt %, based on the weight of the high molecular weight ethylene fraction, of comonomer, preferably 2 to 12 wt % and more preferably 5 to 10 wt %.

Any fraction can be present in a weight ratio of 15 to 50 wt %, preferably 20 to 40 wt %. The polyethylene moulding composition of the invention comprises fractions A, B and C preferably in an amount of 18 to 45 wt % for each fraction, especially 20 to 40 wt % for each fraction. Preferably fractions A, B and C are present in equal amounts, i.e. around 33.3 wt % for each fraction.

In one embodiment, the invention provides a blend consisting of fractions A, B and C, i.e. the sum of fraction A, B and C is 100%. A highly preferred composition of the invention therefore comprises such a blend. Moreover, it is preferred if fractions A, B and C make up the only polyolefinic components in the composition, i.e. the composition consists essentially of those components and standard polymer additives.

Where herein features of fractions (A), (B) and (C) of the composition of the present invention are given, these values are generally valid for the cases in which they can be directly measured on the respective fraction, e.g. when the fraction is separately produced or produced in the first stage of a multistage process.

However, the base resin may also be and preferably is produced in a multistage process wherein e.g. fractions (A), (B) and (C) are produced in subsequent stages. In such a case, the properties of the fractions produced in the second and third step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

The manner in which the polyethylene moulding composition of the invention is produced is not critical to the present invention. The composition can be produced by mechanical blending of the individual fractions, by reactor or in-situ blending, by combinations of these two processes or other means which achieve proper homogenization. For example, the composition can be prepared by mechanical blending of the three fractions in the desired amount, e.g. using a conventional compounding or blending apparatus, like a Banbury mixer, a 2-roll rubber mill, Buss-co-kneader or a twin screw extruder.

Fractions A, B and C used for mechanical blending are prepared separately with any conventional ethylene homo- or respectively co-polymerization method, e.g. in gas phase, slurry phase, liquid (bulk) phase using conventional reactors, such as loop reactor, gas phase reactor, semi-batch or batch reactor, in the presence of a polymerization catalyst.

Preferably, the fractions are produced in a slurry reaction, preferably in a loop reactor, or in a gas phase reactor.

The composition can also be produced by in-situ blending at least two of the three fractions or all three fractions.

By in-situ blending, production of a multimodal polymer is meant wherein the fractions are produced either simultaneously in one reaction stage (e.g. by using different catalysts) and/or are produced in a multistage process.

A multistage process is defined to be a polymerization process in which a polymer comprising two or more fractions is produced by producing each or at least two polymer fraction(s) in a separate reaction stage, usually with different reaction conditions in each stage, in the presence of the reaction product of the previous stage which comprises a polymerization catalyst. The polymerization reactions used in each stage may involve conventional ethylene homopolymerization or copolymerization reactions, e.g. gas-phase, slurry phase, liquid phase polymerizations, using conventional reactors, e.g. loop reactors, gas phase reactors, stirred tank reactors, batch reactors etc. (see for example WO97/44371 and WO96/18662).

Thus, the multimodal polyethylene moulding composition of the invention can be prepared via a multistage reaction sequence comprising successive polymerization steps carried out under predetermined different reaction conditions in respective reactors arranged in series so as to obtain respective polyethylene fractions having different molecular weights. A process of this type can be performed in a suspension medium: in this case, monomers and a molar mass regulator, preferably hydrogen, are firstly polymerized in a first reactor under first reaction conditions in the presence of a suspension medium and a suitable catalyst, then transferred to a second reactor and further polymerized under second reaction conditions, and further transferred to a third reactor and further polymerized under third reaction conditions, with the first reaction conditions differing from the second and third reaction conditions so as to obtain three polyethylene fractions having different molecular weights.

In each production method a polymerization catalyst is used. The polymerization catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports.

Preferably the catalyst is a metallocene catalyst. The preparation of the metallocene catalyst can be carried out according to or analogously to the methods known from the literature and is within the skills of an art skilled person.

Said metallocenes bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl. The metallocene compound may have a formula I:

$$(Cp)_m T_n MA_q \qquad (I)$$

wherein:

each Cp independently is an unsubstituted or substituted and/ or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"3, —OSiR", —SR", —PR"2 or —NR"2, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"2, the two substituents R" can form a ring, e.g. five- or six-membered ring, together with the nitrogen atom wherein they are attached to.

T is a bridge of 1-7 atoms, e.g. a bridge of 1-4 C-atoms and 0-4 heteroatoms, wherein the heteroatom(s) can be e.g. Si, Ge and/or O atom(s), whereby each of the bridge atoms may bear independently substituents, such as $C_1$-$C_{20}$-alkyl, tri($C_1$-$C_{20}$-alkyl)silyl, tri($C_1$-$C_{20}$-alkyl)siloxy or $C_6$-$C_{20}$-aryl substituents); or a bridge of 1-3, e.g. one or two, hetero atoms, such as silicon, germanium and/or oxygen atom(s), e.g. —SiR$^1$$_2$, wherein each R$^1$ is independently $C_1$-$C_{20}$-alkyl, $C_6$-$C_{20}$-aryl or tri($C_1$-$C_{20}$-alkyl)silyl-residue, such as a trimethylsilyl-residue.

M is a transition metal of Group 4 to 6, such as Group 4, e.g. Ti, Zr or Hf.

Each A is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —CH$_2$—Y, wherein Y is $C_{6-20}$-aryl, $C_{6-20}$-heteroaryl, $C_{1-20}$-alkoxy, $C_{6-20}$-aryloxy, —NR"$_2$, —SiR"$_3$ or OSiR"$_3$, —SR", —PR"$_3$, —SiR"$_3$, —OSiR"$_3$ or —NR"$_2$; each R" is independently hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

Each of the above mentioned ring moieties alone or as a part of a moiety as the substituent for Cp, A, R" or $R^1$ can further be substituted e.g. with $C_1$-$C_{20}$-alkyl which may contain Si and/or O atoms;

n is 0, 1 or 2, e.g. 0 or 1,
m is 1, 2 or 3, e.g. 1 or 2,
q is 1, 2 or 3, e.g. 2 or 3, wherein m+q is equal to the valency of M.

More preferably a metallocene compound of formula II $$(Cp)_2MX_2 \quad (II)$$

wherein both Cp are an optionally substituted or an optionally fused homo- or heterocyclopentadienyl ligand;
M is Zr or Hf;
and both X are —$CH_2$—Y, wherein Y is $C_{6-20}$-aryl, $C_{6-20}$-heteroaryl, $C_{1-20}$-alkoxy, $C_{6-20}$-aryloxy, —$NR"_2$, —$SiR"_3$ or $OSiR"_3$,
R" being a $C_{1-20}$ hydrocarbyl or in case of —$NR_2$, the two substituents R can form a ring together with the nitrogen atom wherein they are attached to.

In the formula (II) both Cp are an optionally substituted or an optionally fused homo- or heterocyclopentadienyl ligand, e.g. a substituted or unsubstituted cyclopentadienyl, a substituted or unsubstituted indenyl or a substituted or unsubstituted fluorenyl ligand.

Said optional substituent(s) present on the Cp group are selected from halogen, hydrocarbyl (e.g. $C_{1-20}$-alkyl, $C_{2-20}$-alkenyl, $C_{2-20}$-alkynyl, $C_{3-12}$-cycloalkyl, $C_{6-60}$-aryl or $C_{7-20}$-arylalkyl), $C_{3-12}$-heterocycloalkyl, $C_{5-20}$-heteroaryl, $C_{1-20}$-haloalkyl, —$NR'_2$, —$SiR'_3$ or $OSiR'_3$, R' being a $C_{1-20}$ hydrocarbyl (e.g. $C_{1-20}$-alkyl, $C_{2-20}$-alkenyl, $C_{2-20}$-alkynyl, $C_{3-12}$-cycloalkyl or $C_{6-20}$-aryl) or in case of —$NR'_2$, the two substituents R' can form a ring together with the nitrogen atom wherein they are attached to.

Cp preferably denotes cyclopentadienyl, indenyl, tetrahydroindenyl or fluorenyl, optionally substituted as defined above. More preferably Cp denotes cyclopentadienyl or tetrahydroindenyl.

In a preferred embodiment both Cp groups remain unsubstituted or are both substituted with the same number and kind of substituent.

Preferred substituents include $C_{1-20}$-alkyl, $C_{6-20}$-aryl or $C_{7-20}$-arylalkyl.

Especially preferably the Cp groups are unsubstituted or carry both a $C_{1-6}$-alkyl substituent such as methyl, ethyl, isopropyl or n-butyl.

M is Zr or Hf, especially preferably Hf.

Preferably both Y are selected from $C_{6-20}$-aryl, —$NR"_2$, —$SiR"_3$ or $OSiR"_3$, where R" is defined as above.

More preferably —$CH_2$—Y is benzyl or —$CH_2$—$SiR"_3$, with R" being $C_{1-6}$-alkyl or $C_{6-10}$-aryl.

Particularly preferred are the following compounds:
Bis(n-butylcyclopentadienyl)Hf dibenzyl,
Bis(methylcyclopentadienyl)Hf dibenzyl,
Bis(1,2-dimethylcyclopentadienyl)Hf dibenzyl,
Bis(n-propylcyclopentadienyl)Hf dibenzyl,
Bis(i-propylcyclopentadienyl)Hf dibenzyl,
Bis(1,2,4-trimethylcyclopentadienyl)Zr dibenzyl,
Bis(tetrahydroindenyl)Zr dibenzyl,
Bis(n-butylcyclopentadienyl)Hf($CH_2SiMe_3$)$_2$,
Bis(n-propylcyclopentadienyl)Hf($CH_2SiMe_3$)$_2$,
Bis(i-propylcyclopentadienyl)Hf($CH_2SiMe_3$)$_2$
Bis(1,2,4-trimethylcyclopentadienyl)Zr($CH_2SiMe_3$)$_2$, Most preferred compound is Bis(n-butylcyclopentadienyl)Hf dibenzyl.

The preparation of the metallocenes used according to the invention can be carried out accordingly or analogously to methods known from the literature and is within skills of a person skilled in the field.

The metallocene compounds of formula I can be produced for example as described in EP 1 462 464.

The catalyst composition preferably used in the invention further comprises an alumoxane-impregnated support prepared by contacting an alumoxane or a modified alumoxane with silica as an inert carrier material.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656 and European publications EP-A-0 561 476, EP-B1-0 279 586 and EP-A-0 594-218, and WO 94/10180, all of which are herein fully incorporated by reference.

Preferably, alumoxanes, particularly methylalumoxane or modified methylalumoxane, isobutylalumoxane, e.g. TIBAO (tetraisobutylalumoxane) or MBA( )(hexaisobutylalumoxane) are used to impregnate the support. More preferably methylalumoxane (MAO) is used.

The mole ratio of the Al of the alumoxane component to the metal of the single site catalyst is in the range of between 0.3:1 to 2000:1, preferably 20:1 to 800:1, and most preferably 50:1 to 500:1.

Preferably silica is used as inert carrier. The surface area, pore volume and particle size of the silica can be chosen according to the requirements of the specific polymerization process, in which the catalysts will be used. Typically, silica particles having a surface area in the range of from about 10 to about 700 $m^2$/g (BET method), pore volume in the range of from about 0.1 to about 6.0 $cm^3$/g and average particle size in the range of from about 10 to about 500 μm can be used.

The silica may be in granular, agglomerated, fumed or other form.

It is further preferred that the carrier material is calcinated, i.e. heat treated under air and then with a non-reactive gas such as nitrogen. This treatment is preferably done at a temperature in excess of 100° C., more preferably 200° C. or higher, e.g. 200-800° C., particularly about 600° C. The calcination treatment is preferably effected for several hours, e.g. 2 to 30 hours, more preferably about 10 hours.

The alumoxane-impregnated support is obtained by contacting an alumoxane with silica and heating to a temperature from 50° C. to 100° C. This alumoxane-containing silica is used as support for the metallocene of the formula (I) or (II). Preferably the alumoxane-impregnated support contains less than 15.0 wt % of aluminium, more preferably 9.0 to 14.5 wt % and most preferably 10.0 to 14.0 wt % of aluminium, based on the total weight of the support material and alumoxane.

The catalyst is preferably loaded onto the support material at from 0.05 to 4%, preferably 0.1 to 3.0%, especially 0.2 to 2.0%, by weight of active metal relative to the dry weight of the support material.

The polyethylene composition of the invention may also contain minor quantities of additives such as pigments, nucleating agents, antistatic agents, fillers, antioxidants, processing aids, etc., generally in amounts of up to 10% by weight, preferably up to 5% by weight.

Where additives are present in the composition, the properties of the invention are measured on the composition with additives present.

The present invention further concerns an injection or compression moulded article comprising the polyethylene composition as described hereinbefore, a process for preparing the injection or compression moulded article which comprises injection or compression moulding of the composition into an article, and to the use of the polyethylene composition for injection or compression moulding.

ANALYTICAL INFORMATION

GPC: Molecular weight averages, molecular weight distribution, and polydispersity index (Mn, Mw, MWD, PDI)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2× GMHXL-HT and 1× G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Density

Density of the polymer was determined according to ISO 1183-1987 method D on compression-moulded specimens.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_{190/2}$), 5 kg ($MFR_{190/5}$) or 21.6 kg ($MFR_{190/21}$).

Charpy Impact Strength

Charpy impact strength was determined according to ISO 179:2000 on V-notched samples of 80×10×4 $mm^3$ at 0° C. (Charpy impact strength (0° C.)) and −20° C. (Charpy impact strength (−20° C.)). Samples were cut from plaques of 4 mm thickness prepared by compression molding according to ISO 293:2004 using the conditions defined in chapter 3.3 of ISO 1872-2:2007.

Tensile Properties:

Tensile Modulus

As a measure for stiffness, the tensile modulus (E-modulus) of the compositions was measured at 23° C. on compression moulded specimens according to ISO 527-2:1993. Compression moulded samples were cut from plaques of 4 mm thickness prepared by compression molding according to ISO 293:2004 using the conditions defined in chapter 3.3 of ISO 1872-2:2007. The modulus was measured at a speed of 1 mm/min.

Stress at Yield:

stress at yield (in MPa) was determined on the same samples according to ISO 527-2. The measurement was conducted at 23° C. temperature with an elongation rate of 50 mm/min.

Stress and Strain at Break:

Stress at break (in MPa) and Strain at break (in %) were determined on the same samples according to ISO 527-2. The measurement was conducted at 23° C. temperature with an elongation rate of 50 mm/min.

FNCT Test

ESCR was measured according to the full notch creep test method (FNCT) according to ISO/DIS 16770.3 at 50° C. and 9 MPa stress with a notch depth of 1 mm and specimen dimensions 123 mm×6 mm×20 mm. The solvent used was 10 vol % Igepal CO-630 in deionized water. Compression moulded samples were employed. Samples were cut from plaques of 6 mm thickness prepared by compression molding according to ISO 293:2004 using the conditions defined in chapter 3.3 of ISO 1872-2:2007.

Shore Hardness

The Shore D was measured according to ASTM D2240-05 at 3 or 15 s (hardened steel rod 1.1-1.4 mm diameter with 30° conical point and 0.1 mm radius tip, 44.64 N indentation force). Samples were cut from plaques of 4 mm thickness prepared by compression molding according to ISO 293:2004 using the conditions defined in chapter 3.3 of ISO 1872-2:2007.

Taber Abrasion Resistance

The wear index was calculated as weight loss (in mg) per 1000 cycles according to ASTM D4060-07 (CS-10 wheel). Samples were cut from plaques of 2 mm thickness prepared by compression molding according to ISO 293:2004 using the conditions defined in chapter 3.3 of ISO 1872-2:2007.

Comonomer Content

Comonomer content of the obtained products was measured in a known manner based on Fourier transform infrared spectroscopy (FTIR) calibrated with $^{13}$C-NMR, using Nicolet Magna 550 IR spectrometer together with Nicolet Omnic FTIR software.

Films having a thickness of about 220 to 250 μm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 cm$^{-1}$. The comonomer used in the calibration samples was the same as the comonomer present in the samples. The analysis was performed by using the resolution of 2 cm$^{-1}$, wave number span of from 4000 to 400 cm$^{-1}$ and the number of sweeps of 128. At least two spectra were run from each film. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

EXAMPLES

Catalyst Preparation
Metallocene Complex Preparation:

The catalyst complex used in the polymerisation examples was bis(n-butyl cyclopentadienyl)hafnium dibenzyl, (n-BuCp)$_2$Hf(CH$_2$Ph)$_2$, and it was prepared according to "Catalyst Preparation Example 2" of WO2005/002744, starting from bis(n-butyl cyclopentadienyl)hafnium dichloride (supplied by Witco).

The catalyst preparation was made in a 160 L batch reactor into which a metallocene complex solution was added. Mixing speed was 40 rpm during reaction and 20 rpm during drying. Reactor was carefully flushed with toluene prior to reaction and inertized with nitrogen after silica addition
Preparation of Catalyst Composition 10.0 kg activated silica (commercial silica carrier, XPO2485A, having an average particle size 20 μm, supplier: Grace) were first slurried into 21.7 kg dry toluene at room temperature. Then the silica slurry was added to 14.8 kg of 30 wt % methylalumoxane in toluene (MAO, supplied by Albemarle) during 3 hours. Afterwards the MAO/silica mixture is heated to 79° C. for 6 hours and then cooled down to room temperature again.

The resulting solution was reacted with 0.33 kg of (n-BuCp)$_2$Hf(CH$_2$Ph)$_2$ in toluene (67.9 wt %) for 8 hours at room temperature. The catalyst was dried under nitrogen purge for 5.5 hours at 50° C. The obtained catalyst had an Al/Hf mol-ratio of 200, an Hf-concentration of 0.44 wt % and an Al-concentration of 13.2 wt %.
Polyethylene Moulding Composition
Preparation of Fractions A, B and C The low molecular weight ethylene homopolymer or copolymer fraction A (LMW$_h$- or LMW$_c$ fraction), a medium molecular weight ethylene homopolymer or copolymer fraction B (MMW$_h$ or MMW$_c$ fraction) and a high molecular weight ethylene homopolymer or copolymer fraction C (HMW$_h$ or HMW$_c$-fraction) were produced separately in a plant having a prepolymerization reactor (loop type prepolymerizer 50 dm$^3$) and a loop reactor 500 dm$^3$). The above prepared catalyst was fed into the prepolymerization reactor as 15 wt % oil slurry (primol 352).

Further reaction parameters are disclosed in Table 1.

TABLE 1

| | A18 (LMW$_h$) | A17 (MMW$_h$) | A28 (HMW$_c$) |
|---|---|---|---|
| Prepolymerization | | | |
| T [° C.] | 60 | 60 | 60 |
| Pressure [bar] | 60 | 60 | 60 |
| Catalyst feed [g/h] | 35 | 29.7 | 15.2 |
| Antistatic feed [ppm] Octastat 3000 | 5 | 5 | 0 |
| Ethylene-feed [kg/h] | 0 | 2 | 0 |
| H$_2$-feed [g/h] | 0 | 1 | 0 |
| Propane-feed [kg/h] | 47 | 47 | 34 |
| Loop | | | |
| T [° C.] | 85 | 85 | 80 |
| Pressure [bar] | 57 | 57 | 57 |
| Ethylene feed [kg/h] | 37 | 37 | 30 |
| H$_2$-feed [g/h] | 8 | 1.8 | 0 |
| Hexene-feed [kg/h] | 0 | 0 | 5 |
| Propane-feed [kg/h] | 82 | 82 | 82 |
| C$_2$-conc [mol %] | 7.6 | 6.2 | 6.2 |
| H$_2$/C$_2$-ratio [mol/kmol] | 0.48 | 0.07 | 0.06 |
| C$_6$/C$_2$-ratio [mol/kmol] | — | — | 207 |
| Production rate [kg/h] | 32.3 | 34.0 | 29.1 |
| Properties | | | |
| Irganox B225 [ppm] | 2000 | 2000 | 2000 |
| MFR$_{190/2}$ [g/10 min] | 340 | 0.93 | — |
| MFR$_{190/21}$ [g/10 min] | — | 17 | 0.89 |
| Density [kg/m$^3$] | 972.4 | 954.5 | 907.4 |
| M$_w$ [kg/mol] | 24 | 129 | 272 |
| C$_6$-content [wt %] | — | — | 8.6 |

| | A22 (LMW$_c$) | A25 (MMW$_c$) | A15 (HMW$_h$) |
|---|---|---|---|
| Prepolymerization | | | |
| T [° C.] | 60 | 60 | 60 |
| Pressure [bar] | 58 | 59 | 60 |
| Catalyst feed [g/h] | 19.9 | 28.2 | 30.9 |
| Antistatic feed [ppm] Octastat 3000 | 0 | 0 | 5.0 |
| Ethylene-feed [kg/] | 0 | 0 | 2.0 |
| H$_2$-feed [g/h] | 0 | 0 | 0.7 |
| Propane-feed [kg/h] | 34.3 | 34.2 | 47.4 |
| Loop | | | |
| T [° C.] | 74 | 85 | 85 |
| Pressure [bar] | 57 | 57 | 56 |
| Ethylene (C$_2$)-feed [kg/] | 35 | 38 | 34 |
| H$_2$-feed [g/h] | 12 | 1.2 | 0 |
| Hexene(C$_6$)-feed [kg/h] | 5.2 | 4.2 | 0 |
| Propane-feed [kg/h] | 67 | 67 | 82 |
| C$_2$-concentration [mol %] | 6.2 | 5.3 | 5.9 |
| H$_2$/C$_2$-ratio [mol/kmol] | 0.5 | 0.12 | 0.02 |
| C$_6$/C$_2$-ratio [mol/kmol] | 219 | 111 | — |
| Production rate [kg/h] | 33.4 | 36.9 | 31.0 |
| Properties | | | |
| Irganox B225 added [ppm] | 2000 | 2000 | 2000 |
| MFR$_{190/2}$ [g/10 min] | 370 | 0.5 | — |
| MFR$_{190/21}$ [g/10 min] | — | — | 0.88 |
| Density [kg/m$^3$] | 922 | 915.4 | 944 |

TABLE 1-continued

| | | | |
|---|---|---|---|
| $M_w$ [kg/mol] | 24 | 138 | 294 |
| $C_6$-content [wt %] | 8.3 | 6.9 | — |

The basic properties of the formed grades are given in Table 2. Lots A15, A17 and A18 are homopolymers; lots A22, A25 and A28 are hexene copolymers.

TABLE 2

Basic properties of each of the unimodal fractions.

| | A15 (HMW$_h$) | A17 (MMW$_h$) | A18 (LMW$_h$) | A22 (LMW$_c$) | A25 (MMW$_c$) | A28 (HMW$_c$) |
|---|---|---|---|---|---|---|
| d, kg/m³ | 944.0 | 954.5 | 972.4 | 922.7 | 915.4 | 907.4 |
| MFR$_{190/2}$ | NA | 0.93 | 340 | 370 | 0.5 | NA |
| MFR$_{190/21}$ | 0.88 | 17 | NA | NA | NA | 0.89 |
| MW, kg/mol | 294 | 129 | 24 | 24 | 138 | 272 |
| hexene, wt % | 0 | 0 | 0 | 8.3 | 6.9 | 8.3 |

12 different polyethylene compositions were prepared by melt-extrusion blending.

Preparation of the Polyethylene Blend

The three fractions were blended and melt—homogenized in an extruder.

Compounding was done by the kneading on an intermeshing co-rotating twin screw extruder Prism TSE 16 having a screw diameter D of 16 mm and an L/D ratio of 25, using high intensity mixing screws equipped with kneading blocks. The temperature profile along the screw length was set to 210° C./215° C./220° C./215° C./210° C., using an output rate: of 1-1.5 kg/hr and a screw speed of 200 RPM. Each composition was extruded twice to ensure proper homogenization. Each blend consists of three fractions, one of them being homopolymer. The exact composition of each blend is given in the Table 3.

TABLE 3

The composition of the inventive examples (weight fraction).

| | A15 (HMW$_h$) | A17 (MMW$_h$) | A18 (LMW$_h$) | A22 (LMW$_c$) | A25 (MMW$_c$) | A28 (HMW$_c$) |
|---|---|---|---|---|---|---|
| Example-1 | | | 33.3 | | 33.3 | 33.3 |
| Example-2 | 33.3 | | | 33.3 | 33.3 | |
| Example-3 | | 33.3 | | 33.3 | | 33.3 |
| Example-4 | | | 40.0 | | 20.0 | 40.0 |
| Example-5 | 40.0 | | | 40.0 | 20.0 | |
| Example-6 | | 20.0 | | 40.0 | | 40.0 |
| Example-7 | | | 20.0 | | 40.0 | 40.0 |
| Example-8 | 40.0 | | | 20.0 | 40.0 | |
| Example-9 | | 40.0 | | 20.0 | | 40.0 |
| Example-10 | | | 40.0 | | 40.0 | 20.0 |
| Example-11 | 20.0 | | | 40.0 | 40.0 | |
| Example-12 | | 40.0 | | 40.0 | | 20.0 |

Mechanical Properties

Mechanical properties of the blends are presented in the Table 4. Commercial Borstar grade ME6053 was tested as a reference material.

Figure 1:
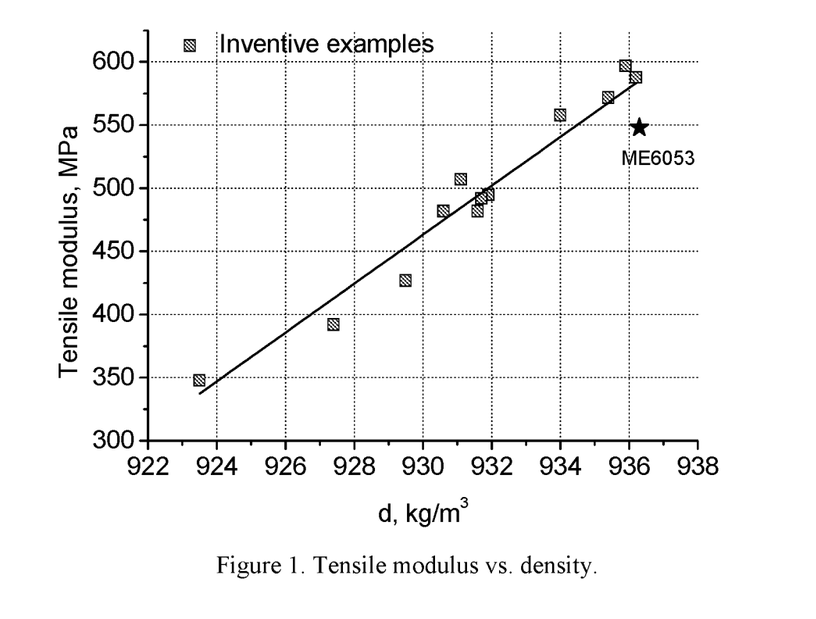
FIG. 1 shows the relationship between tensile modulus vs. density for compositions of the invention.
Figure 2:
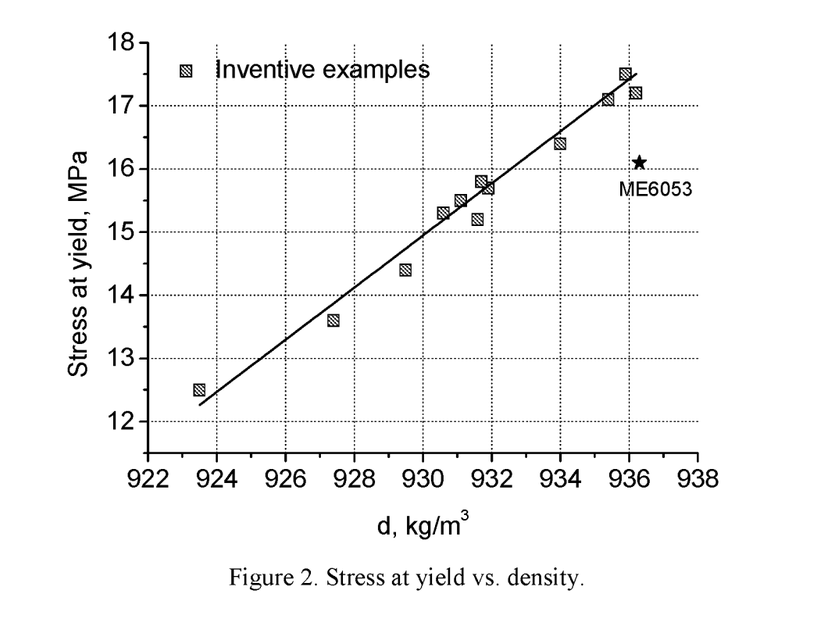
FIG. 2 shows the relationship between stress at yield vs. density for compositions of the invention.

The comparison of mechanical properties in a graphical form is shown in FIGS. 1-2. As can be seen from these graphs, at similar density, described blends show superior mechanical properties compare to Borstar reference ME6053.

TABLE 4

Density, MFR and mechanical properties of the blends (ME6053 tested for comparison).

| | d, kg/m³ | MFR$_{190/2}$, g/10 min | Tensile modulus, MPa | Stress at yield, MPa | Stress at break, MPa | Strain at break, % |
|---|---|---|---|---|---|---|
| Example-1 | 931.1 | 0.60 | 507 | 15.5 | 33.5 | 595.5 |
| Example-2 | 931.9 | 0.47 | 495 | 15.7 | 23.9 | 685 |
| Example-3 | 931.6 | 0.76 | 482 | 15.2 | 24 | 645 |
| Example-4 | 934.0 | 0.4 | 558 | 16.4 | 31.9 | 547 |
| Example-5 | 935.4 | 0.39 | 572 | 17.1 | 24 | 800 |
| Example-6 | 927.4 | 0.35 | 392 | 13.6 | 21.9 | 565 |
| Example-7 | 923.5 | 0.16 | 348 | 12.5 | 25.8 | 478 |
| Example-8 | 931.7 | 0.14 | 492 | 15.8 | 26.6 | 700 |

TABLE 4-continued

Density, MFR and mechanical properties of the blends (ME6053 tested for comparison).

| | d, kg/m³ | MFR$_{190/2}$, g/10 min | Tensile modulus, MPa | Stress at yield, MPa | Stress at break, MPa | Strain at break, % |
|---|---|---|---|---|---|---|
| Example-9 | 930.6 | 0.21 | 482 | 15.3 | 26.6 | 618 |
| Example-10 | 935.9 | 0.69 | 597 | 17.5 | 32.6 | 597 |
| Example-11 | 929.5 | 0.66 | 427 | 14.4 | 20.4 | 602 |
| Example-12 | 936.2 | 0.96 | 588 | 17.2 | 22.9 | 697 |
| ME6053 | 936.3 | 0.67 | 548 | 16.1 | 13.8 | 356 |

Hardness and Abrasion

Figure 3:
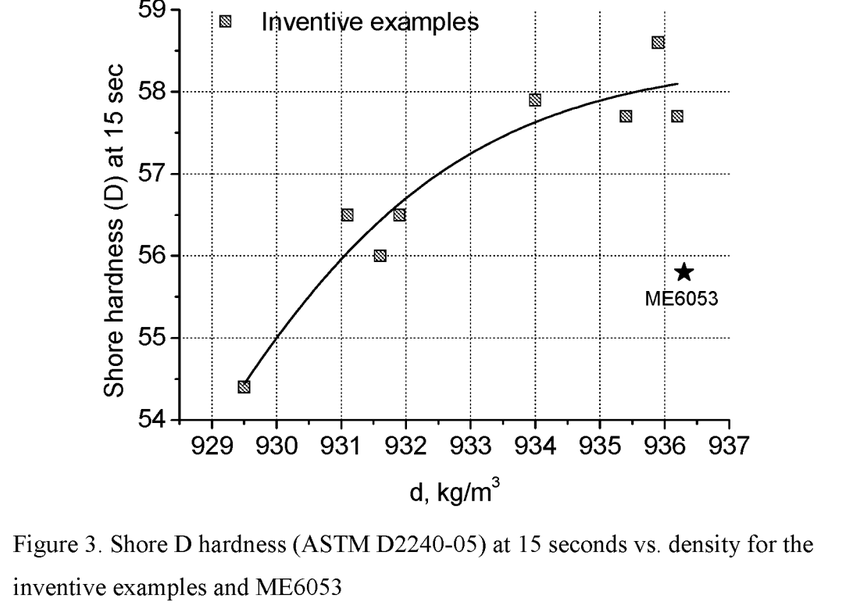
FIG. 3 shows Shore D hardness (ASTM D2240-05) at 15 seconds vs. density for compositions of the invention.
Figure 4:
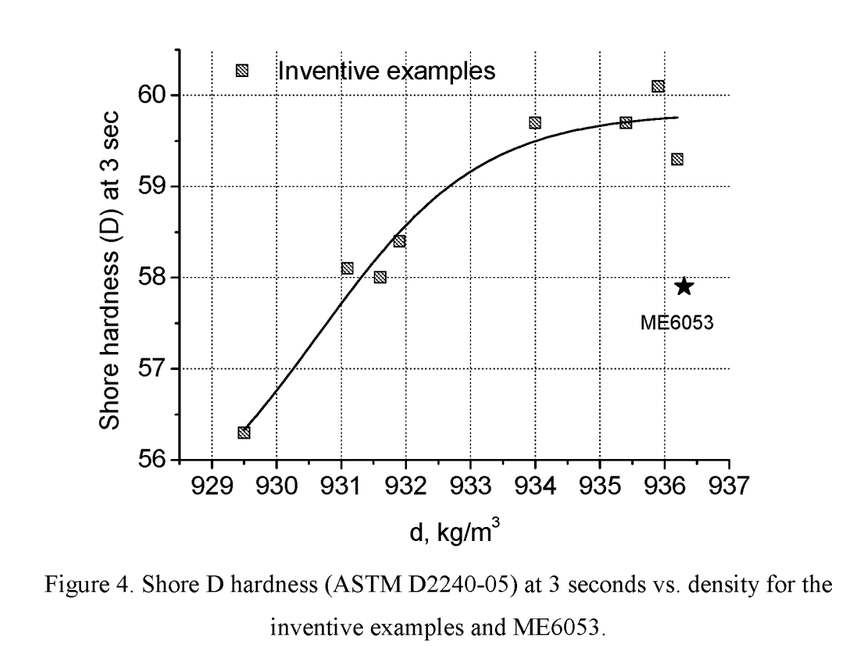
FIG. 4 shows the relationship between Shore D hardness (ASTM D2240-05) at 3 seconds vs. density for compositions of the invention.

Shore D hardness (ASTM D2240-05, measured at 3 and 15 seconds) and Taber abrasion resistance (as wear coefficient, ASTM D4060-07, CS-10 wheel) results are given in the Table 5. The same data in graphical form are shown in FIGS. 3 and 4.

TABLE 5

Shore D hardness (ASTM D2240-05) and Taber abrasion resistance (ASTM D4060-07, CS-10 wheel) for the inventive examples and the reference polymer (ME6053).

| | Shore D (15 sec) | Shore D (3 sec) | Wear index |
|---|---|---|---|
| Example-1 | 56.5 | 58.1 | 3.7 |
| Example-2 | 56.5 | 58.4 | 5.1 |
| Example-3 | 56.0 | 58.0 | 6.6 |
| Example-4 | 57.9 | 59.7 | 5.3 |
| Example-5 | 57.7 | 59.7 | 6.8 |
| Example-10 | 58.6 | 60.1 | 5.9 |
| Example-12 | 57.7 | 59.3 | 9 |
| ME6053 | 55.8 | 57.9 | 8.9 |

As is clear from the FIGS. 3 and 4, the inventive examples show consistently better hardness and abrasion resistance compared to Borstar reference ME6053 (at similar density). This means that either similar hardness and abrasion resistance can be achieved with the composition of the invention with lower density (up to 5 units lower with the benefits in terms of lower flexural modulus that entails).

Alternatively, at the same density, hardness and abrasion resistance can be increased.

The data presented in Table 5 clearly shows that the disclosed polymer compositions possess better abrasion resistance as compare to the reference ME6053.

Impact and ESCR Properties

Samples Examples-1, -4, -7 and -10 were tested for impact strength and ESCR in comparison with ME6053.

Impact strength (charpy impact-notched, according to ISO179) at 0° C. and −20° C. as well as FNCT at 9.0 MPa and 50° C. (according to ISO 16770:2004E) were performed on compression moulded specimens. The rest results are given in Table 6, the same information in graphical form in presented in FIGS. 5 and 6.

Figure 5:
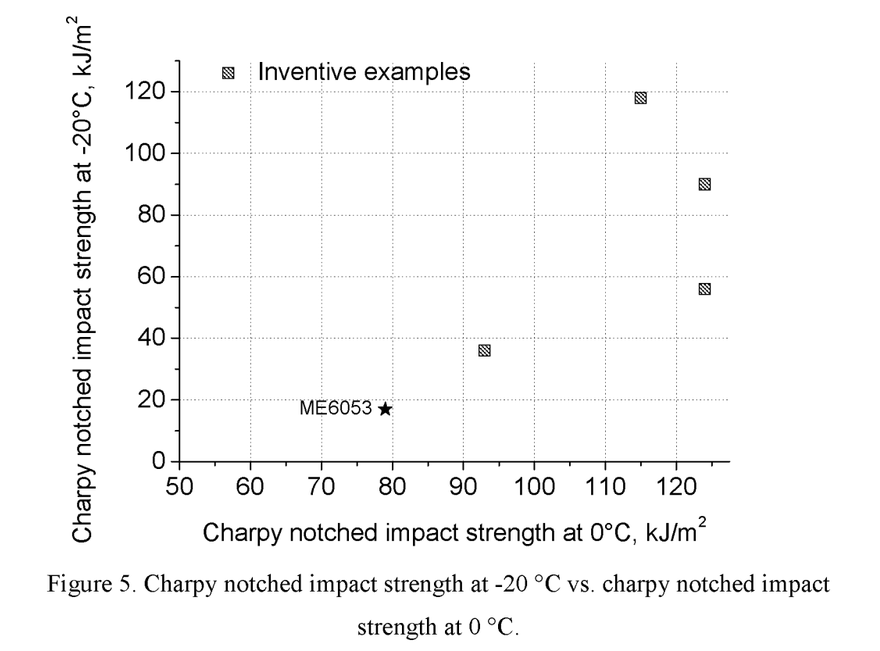
FIG. 5 shows the relationship between Charpy notched impact at −20° C. vs. Charpy notched impact at 0° C. for compositions of the invention.

As it is clear from FIG. 5, consistently higher impact values are observed for the inventive examples compare to the reference resin. The difference is particularly remarkable for the impact strength at low temperature.

Figure 6:
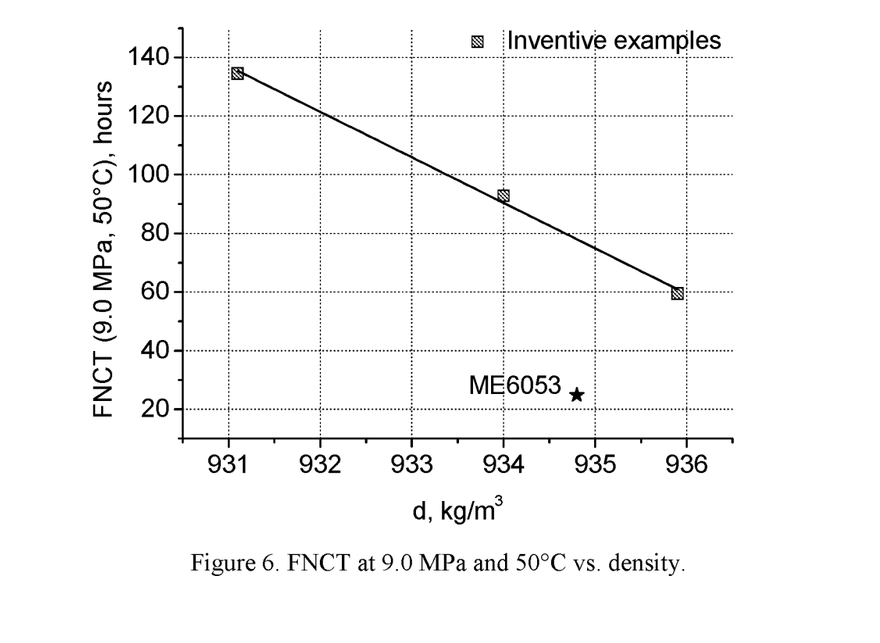
FIG. 6 shows the relationship between FNCT at 9.0 MPa and 50° C. vs. density for compositions of the invention.

Not surprisingly, FNCT drops down with increasing density (FIG. 6). However, one can see that the trend line for the inventive examples lies well above the value for the reference material (ME6053).

TABLE 6

Charpy (at 0° C. and −20° C.) and FNCT (at 9.0 MPa and 50° C.) for the blends and the reference polymer ME6053.

| | Charpy impact 0° C., kJ/m² | Charpy impact −20° C., kJ/m² | FNCT (9.0 MPa, 50° C.), hours |
|---|---|---|---|
| Example-1 | 124 | 90 | 135 |
| Example-4 | 124 | 56 | 93 |
| Example-7 | 115 | 118 | NA |
| Example-10 | 93 | 36 | 60 |
| ME6053 | 79 | 17 | 25 |

Hence, one can conclude that the disclosed polymer compositions show an increased slow crack growth and impact strength compared to the reference ME6053.

The invention claimed is:

1. A polyethylene moulding composition having a multi-modal molecular weight distribution, having a density according to ISO 1183 at 23° C. in the range of 920 to 960 kg/m³ and an MFR$_{190/2}$ according to ISO 1133 in the range of 0.05 to 10 g/10 min, said polyethylene moulding composition comprising at least three ethylene polymer fractions having distinct molecular weights:
   A) 15 to 50 wt % of a low molecular weight ethylene homopolymer or copolymer fraction with a weight average molecular weight $M_w$ in the range of 15 to 40 kg/mol;
   B) 15 to 50 wt % of a medium molecular weight ethylene homopolymer or copolymer fraction with a weight average molecular weight $M_w$ in the range of 70 to 200 kg/mol; and
   C) 15 to 50 wt % of a high molecular weight ethylene homopolymer or copolymer fraction with a weight average molecular weight $M_w$ in the range of 220 to 400 kg/mol,
   provided that one of A, B and C is an ethylene homopolymer and at least one other component is an ethylene copolymer with at least one $C_3$-$C_{10}$ comonomer;
   and wherein the composition has
   a Shore D hardness measured according to ASTM D2240-05 (15 sec) of at least 56.0.

2. The composition according to claim 1 having a Taber abrasion resistance measured according to ASTM D4060-07 with CS-10 wheel of less than 8 mg/1000 cycles.

3. The composition according to claim 1 wherein fractions A, B and C are present in amounts of 20 to 40 wt % for each fraction.

4. The composition according to claim 1 having a tensile modulus measured on compression moulded samples of at least 300 MPa;
   a Charpy impact strength CIS (0° C.) measured on V-notched samples produced by compression moulding of at least 90 kJ/m²;
   a Charpy impact strength CIS (−20° C.) measured on V-notched samples produced by compression moulding of at least 30 kJ/m²;
   and an environmental stress crack resistance ESCR measured as FNCT full notch creep test according to ISO/DIS 16770.3 at 50° C. and 9 MPa of at least 20 h.

5. The composition according to claim 1 wherein Fraction A is either a homopolymer fraction having a density in the range of 965 to 980 kg/m³ or Fraction A is a copolymer fraction having a density in the range of 920 to 930 kg/m³.

6. The composition according to claim 1 wherein Fraction B is a homopolymer fraction having a density in the range of 950 to 965 kg/m³ or Fraction B is a copolymer fraction having a density in the range of 910 to 920 kg/m³.

7. The composition according to claim 1 wherein Fraction C is either a homopolymer fraction having a density in the range of 935 to 950 kg/m³ or Fraction C is a copolymer fraction having a density less than 910 kg/m³.

8. The composition according to claim 1 wherein Fraction A is an ethylene homopolymer and fractions B and C are ethylene copolymers.

9. The composition according to claim 1 wherein each copolymer fraction has a $C_3$-$C_{10}$ comonomer content in the range of 1 to 15 wt %.

10. The composition according to claim 1 wherein each copolymer comprises ethylene and hexene.

11. The composition according to claim 1 having a density according to ISO 1183 at 23° C. in the range of 920 to 940 kg/m³.

12. A polyethylene moulding composition having a multimodal molecular weight distribution, having a density according to ISO 1183 at 23° C. in the range of 920 to 960 kg/m³ and an $MFR_{190/2}$ according to ISO 1133 in the range of 0.05 to 10 g/10 min, said polyethylene moulding composition comprising at least three ethylene polymer fractions having distinct molecular weights:
  A) 15 to 50 wt % of a lower molecular weight ethylene homopolymer or copolymer fraction with an $MFR_{190/2}$ according to ISO 1133 of at least 50 g/10 min;
  B) 15 to 50 wt % of a medium molecular weight ethylene homopolymer or copolymer fraction with an $MFR_{190/2}$ of less than 10 g/10 min; and
  C) 15 to 50 wt % of a higher molecular weight ethylene homopolymer or copolymer fraction with an $MFR_{190/21}$ less than that of fraction B and in the range of 0.05 to 5 g/10 min.,
  provided that one of A, B and C is an ethylene homopolymer and at least one other component is an ethylene copolymer with at least one $C_3$-$C_{10}$ comonomer;
  and wherein the composition has
  a Shore D hardness measured according to ASTM D2240-05 (15 sec) of at least 56.0.

13. The composition according to claim 1 wherein each fraction is manufactured using a single site catalyst.

14. A moulded article comprising the polyethylene composition according to claim 1.

15. A process for the preparation of a polyethylene moulding composition, the process comprising blending A) 15 to 50 wt % of a low molecular weight ethylene homopolymer or copolymer fraction with a weight average molecular weight $M_w$ in the range of 15 to 40 kg/mol;
  B) 15 to 50 wt % of a medium molecular weight ethylene homopolymer or copolymer fraction with a weight average molecular weight $M_w$ in the range of 70 to 200 kg/mol; and
  C) 15 to 50 wt % of a high molecular weight ethylene homopolymer or copolymer fraction with a weight average molecular weight $M_w$ in the range of 220 to 400 kg/mol,
  provided that one of A, B and C is an ethylene homopolymer and at least one other component is an ethylene copolymer with at least one $C_3$-$C_{10}$ comonomer;
  and wherein the composition has
  a multimodal molecular weight distribution,
  a density according to ISO 1183 at 23° C. in the range of 920 to 960 kg/m³;
  an $MFR_{190/2}$ according to ISO 1133 in the range of 0.05 to 10 g/10 min, and
  a Shore D hardness measured according to ASTM D2240-05 (15 sec) of at least 56.0.

16. The composition according to claim 2 having a Taber abrasion resistance measured according to ASTM D4060-07 with CS-10 wheel of less than 7 mg/1000 cycles.

17. The composition according to claim 3 wherein fractions A, B and C are present in amounts of 33.3 wt % for each fraction.

18. The composition according to claim 5 wherein Fraction A is either a homopolymer fraction having a density in the range of 970 to 975 kg/m³ or Fraction A is a copolymer fraction having a density in the range of 920 to 925 kg/m³.

19. The composition according to claim 6 wherein Fraction B is a homopolymer fraction having a density in the range of 952 to 957 kg/m³ or Fraction B is a copolymer fraction having a density in the range of 912 to 917 kg/m³.

20. The composition according to claim 7 wherein Fraction C is a homopolymer fraction having a density in the range of 942 to 947 kg/m³.

21. The composition according to claim 11 having a density according to ISO 1183 at 23° C. in the range of 925 to 935 kg/m³.

* * * * *